Feb. 12, 1935. A. B. FIELD ET AL 1,990,780
APPARATUS FOR THE TRANSFORMATION OF DIRECT ELECTRIC CURRENTS
Filed Feb. 28, 1934 2 Sheets-Sheet 1
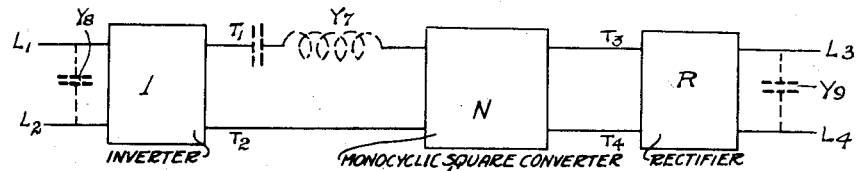
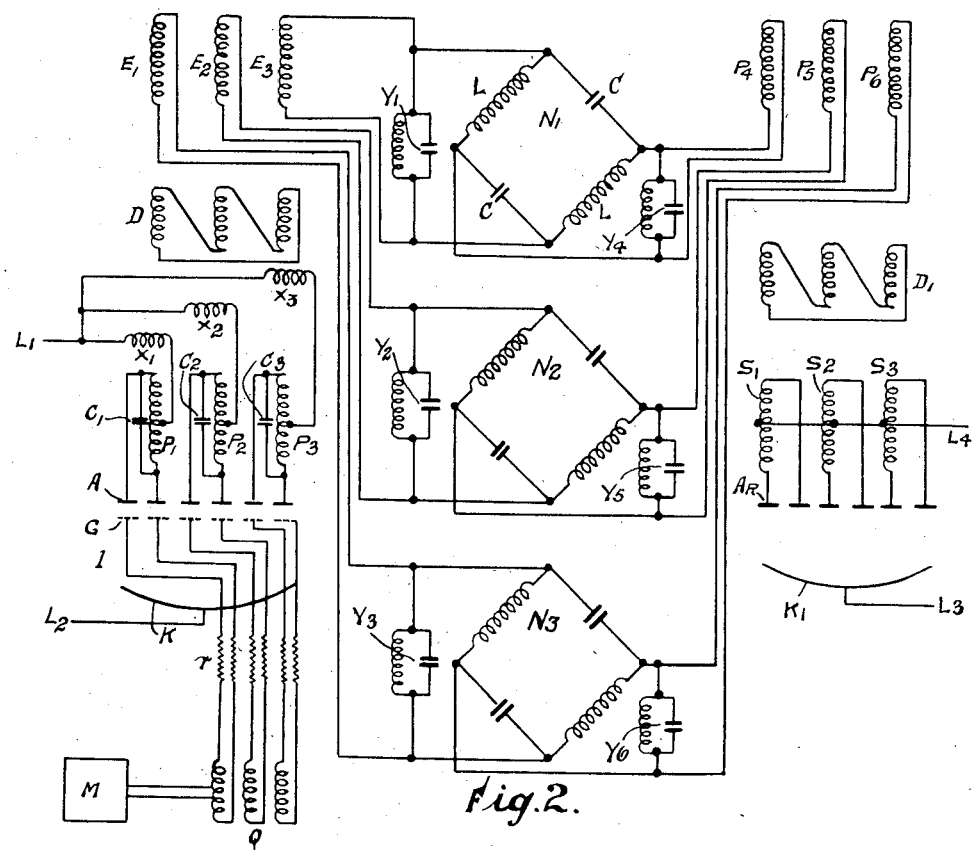
Inventors:
Allan B. Field,
Cecil Dannatt,
by Harry E. Dunham
His Attorney.

Inventors:
Allan B. Field,
Cecil Dannatt,
by Harry E. Dunham
Their Attorney.

Patented Feb. 12, 1935

1,990,780

UNITED STATES PATENT OFFICE 1,990,780

APPARATUS FOR THE TRANSFORMATION OF DIRECT ELECTRIC CURRENTS

Allan Bertram Field, Marple, and Cecil Dannatt, Stretford, Manchester, England, assignors to General Electric Company, a corporation of New York Application February 28, 1934, Serial No. 713,402
In Great Britain March 4, 1933

7 Claims. (Cl. 171—97)

This invention relates to the transformation of direct electric currents and has for its object to provide an improved apparatus for transforming a supply of direct electric current at substantially constant voltage into direct electric current which shall be of substantially constant strength.

According to the invention the improved apparatus comprises the combination of three known pieces of apparatus as follows, first, an inverter device for transforming a constant voltage direct current into an alternating current, also of constant voltage, which device comprises electric valves, preferably vapour electric discharge tubes, included in circuit together with a transformer or transformers when necessary, the discharge tubes being furnished with control electrodes by which the frequency of the alternating current output obtained can be regulated and maintained at a value suitable for the second item of the combination and therefore higher than is feasible for ordinary power transmission purposes, secondly, an arrangement of inductive reactances and capacitative reactances, such for instance as that known as a monocyclic square, by which alternating current at constant voltage is transformed into alternating current the strength of which is constant, and thirdly a rectifier for transforming alternating current into direct current.

Our invention may be better understood from the following description taken in connection with the accompanying drawings and its scope will be pointed out in the appended claims.

Figure 3:
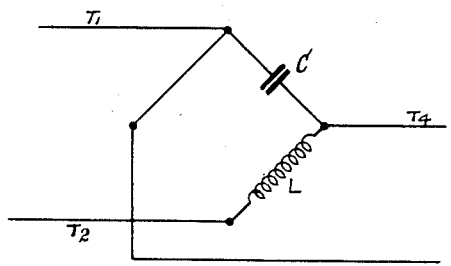
Figure 4:
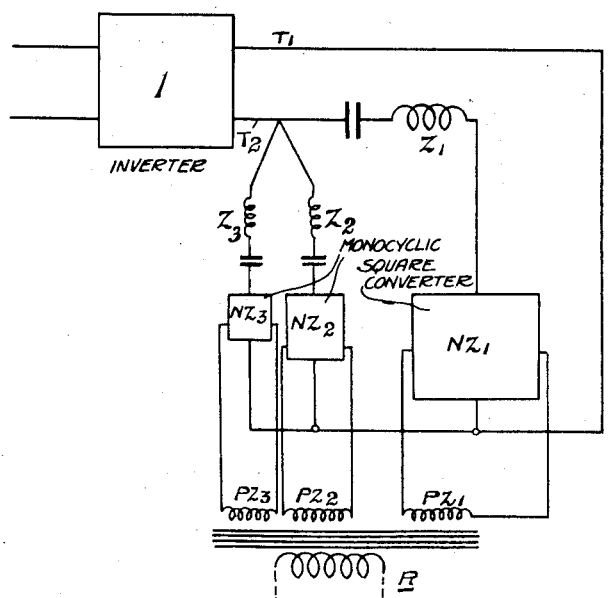

In the drawings Fig. 1 is a simple schematic diagram of the circuit elements arranged in accordance with our invention, Fig. 2 is a diagrammatic circuit arrangement of one embodiment of our invention, and Figs. 3 and 4 are modifications of portions of the circuit arrangement shown in Fig. 2.

Referring to Fig. 1, which shows in its simplest form a circuit arranged to carry out the invention, $L_1$, $L_2$ are direct current mains delivering current at constant voltage to an inverter I which may be of any known type in which the frequency of the alternating current delivered can be controlled. $T_1$, $T_2$ are alternating current mains by which the current received from the inverter, which is at constant voltage, is delivered to an alternating current converting network N. From the converting network N alternating current at constant strength is delivered by the mains $T_3$, $T_4$ to a rectifying device R of any suitable known type which delivers its output in the form of direct current of constant strength at variable voltage by the mains $L_3$, $L_4$. As stated, the inverter I, converting network N and rectifier R may be of any suitable known type, but in the figure which will now be described specific arrangements for these three parts of the apparatus are shown which may be adopted.

In Fig. 2 the positive direct current supply main is indicated at $L_1$ and is connected through three separate reactances $X_1$, $X_2$, $X_3$ to the middle points respectively of the primary windings $P_1$, $P_2$, $P_3$ of a transformer for transforming alternating current from three-phase to six-phase. The six anodes A of a six-phase mercury vapour inverter I are connected to the three ends of the primary windings $P_1$, $P_2$, $P_3$ which are bridged by the commutating condensers $C_1$, $C_2$, $C_3$. A delta connected tertiary winding D on the transformer provides for triple frequency circulating currents and avoids the necessity of providing for these in the alternating current intermediate stage of the arrangements. It will be understood that the tertiary winding is not otherwise used, that is to say it is on open circuit as far as currents of main or fundamental frequency are concerned. The cathode of the vapour inverter is indicated at K and is connected to the negative main $L_2$. The three-phase secondary windings of the transformer are indicated at $E_1$, $E_2$, $E_3$ and these are connected to feed alternating currents at constant voltage to the three alternating current converting networks $N_1$, $N_2$, $N_3$. These networks will be referred to generally as monocyclic networks and consist of inductances L and capacitances C. When connected in a closed circuit to form a square, as illustrated, the device is commonly called a monocyclic square. The relation between the capacity C, the inductance L and frequency is in accordance with the equation $$(2\pi f)^2 LC = 1$$

where $f$ if the frequency of the alternating current supply. The two halves of the square are similar, and, as well known, when alternating current at constant voltage is supplied to two diagonally opposite points of the square the conjugate points will give a constant current of the same frequency at variable voltage. Rejector circuits $Y_1$, $Y_2$, $Y_3$ are connected across the respective phases tuned to obstruct currents of fundamental frequency and to pass the higher harmonics. Similar rejector circuits indicated at $Y_4$, $Y_5$, $Y_6$ are connected across the constant current circuits. The rectifying device indicated at R is of a similar type to that used for the inverter I, its six anodes AR being connected to the terminals of three secondary windings $S_1$, $S_2$, $S_3$ of a transformer the primary windings $P_4$, $P_5$, $P_6$ of which are respectively connected to the three phases of the constant alternating current delivered by the monocyclic squares $N_1$, $N_2$, $N_3$. $D_1$ is a tertiary winding which may be provided on the transformer to provide for any alternating currents of higher frequency which may enter the primary windings $P_4$, $P_5$, $P_6$ notwithstanding the provision of the rejector circuits $Y_1$ to $Y_6$ inclusive. The midpoints of the secondary windings $S_1$, $S_2$, $S_3$ are connected together and to the negative lead $L_4$ of the constant direct current output circuit and the cathode $K_1$ is connected to the positive lead $L_3$ of the output circuit.

In order to control the frequency of the alternating current supplied from the inverter I a small independent alternator Q driven by any suitable source of power M supplies current voltages to the grid electrodes G of the inverter through limiting resistances $r$. The motor M for driving the generator is subjected to close speed governing.

Should regeneration be required, that is, a constant current supply to the mains $L_3$, $L_4$ be required to be delivered as a current of variable strength and constant voltage at the mains $L_1$, $L_2$, it will occur to those skilled in the art that the rectifier R may be provided with grid electrodes similar to those indicated for the inverter in the drawings, with commutating condensers connected across the secondary windings $S_1$, $S_2$, $S_3$ in accordance with the arrangement illustrated at the transmitter end. It will be necessary to provide means such as a changeover drum to transfer the connections of the generator Q from the grid electrodes G of the inverter to those of the rectifier with interlocking devices whereby previous to the changeover the alternating current on the constant current side is short-circuited and on the constant voltage side open-circuited while the necessary arrangements are made on the constant current side to reverse the polarity of voltage, i. e. that of the mains $L_3$, $L_4$. For instance if the load connected to the mains $L_3$, $L_4$ were a direct current motor the field of the motor may be reversed so that with an unchanged direction of current flow in the circuit the power flow will be reversed.

The alternating current converting network is not limited to the use of a monocyclic square shown in Fig. 2 as the conversion from constant voltage to constant current may be obtained if one-half only of the network is employed, for example as shown in Fig. 3 where $T_1$, $T_2$ are alternating current mains, for example one of the pairs of mains connected to the secondary windings $E_1$, $E_2$, $E_3$ of Fig. 2, and are supplied with alternating current at constant voltage, and $T_4$, $T_5$ are alternating current mains connected to one of the primary windings $P_4$, $P_5$, $P_6$ of Fig. 2 supplying alternating currents of constant strength. $T_3$ can be connected to either $T_1$ as shown or to $T_2$. The symmetrical arrangement as shown in Fig. 2 is, however, preferable in most cases.

In place of connecting rejector circuits $Y_1$ to $Y_6$ across the alternating current mains as indicated in Fig. 2, acceptor circuits consisting of inductances and capacity tuned to pass alternating currents of the fundamental or main frequency may be inserted in series with the alternating current mains between the inverter and the alternating current converting network as indicated in broken lines at $Y_7$ in Fig. 1.

Reverting again to the simple single-phase arrangement shown in Fig. 1, the wave form of current with which the rectifier R should advantageously be fed in order to produce a smooth direct current output will correspond fairly closely to the wave form of current which the inverter I is preferably arranged to deliver in order to take a stated direct current input. Such a current wave will have a predominant fundamental, namely a frequency in accordance with the control voltage on the inverter and a series of odd harmonics, the amplitudes of which diminish substantially in proportion to their order.

In order to reduce the size of condensers and inductances in the alternating current converting network N, the control frequency of the inverter I will be chosen as high as is consistent with satisfactory operation of the inverter, 500 cycles per second for example. The harmonics referred to will consequently be of comparatively high frequency and the first one or two may be provided for by subsidiary alternating current converting networks similar to that indicated at N, but tuned to the selected harmonic frequency. The effects of harmonics beyond the first occurring or the first one or two occurring are of sufficiently high frequency to be dealt with without special devices, by condenser shunts across the input and output direct current mains respectively as indicated in broken lines at $Y_8$ and $Y_9$ in Fig. 1.

An arrangement for dealing with the fundamental (controlled frequency) and the first two harmonics which occur is shown in Fig. 4. In the output mains $T_1$, $T_2$ from the inverter I a tuned choke $Z_1$ passing current at fundamental frequency is inserted. Tapped off from the same main, but prior to said choke or prior to the inductance part of it, a pair of circuits is tapped off, each including an acceptor combination of inductance and capacitance $Z_2$ and $Z_3$ respectively. These are tuned to pass respectively the first and second harmonics to be dealt with. The branch circuits are connected to the subsidiary alternating current converting networks $NZ_2$ and $NZ_3$ tuned to deal with their respective harmonic frequencies in the same way as the alternating current converting network $NZ_1$ which is connected to the choke $Z_1$. The constant current outputs from the networks $NZ_1$, $NZ_2$, $NZ_3$ are supplied to the three primary windings $PZ_1$, $PZ_2$, $PZ_3$ of the transformer, the secondary windings of which feed the rectifier R. The ratios of turns of the windings $PZ_2$ and $PZ_3$ to the winding $PZ_1$ are arranged so that the rectifier receives the harmonics in the proper proportion for rectification when such harmonics have the proper proportion to the fundamental in the output from the inverter I.

In the case of an alternating current converter consisting of a monocyclic square, as shown in Fig. 2, the current from the output terminals is substantially 90° displaced in phase from the voltage across the input terminals while the phase and value of the current in the input circuit is determined by the phase and value of the voltage across the output terminals with respect to the output current, as demanded by the load in the output circuit. Thus, if $Z_2$, $Z_3$ are dealing with odd harmonics, say the third and fifth respectively, the secondary currents from $NZ_2$, $NZ_3$ which will be 90° of harmonic phase displaced from the primary voltage across the networks, will be effectively displaced in phase plus or minus a quarter period of the fundamental frequency, and therefore by connecting $NZ_2$ and $NZ_3$ to the primary windings $PZ_2$, $PZ_3$ in a suitable sense, will combine in their effects with the current in $PZ_1$ in a suitable phase. Since, however, the circuits will not have ideal characteristics, there will be slight discrepancies of phase between the current in $PZ_1$ and the voltage across $T_1$, $T_2$ compared with the ideal conditions, and the corresponding displacement will not be precisely the same for the circuits of higher frequency including the elements $Z_2$, $Z_3$, $NZ_2$ and $NZ_3$.

The effect can be minimized to some extent by ensuring such proportions of the impedances $Z_1$, $Z_2$, $Z_3$ that such phase shift as occurs under given load conditions in $Z_1$ occurs to an extent increased in proportion to the order of the harmonic in $Z_2$ and similarly in $Z_3$. Further, the introduction of resistance in the inductive arms of the alternating current converter has the effect of advancing the phase of the secondary current relatively to the primary voltage and in the capacitative arms retarding this phase under no load conditions. Some degree of phase adjustment can be obtained in this manner without unduly disturbing the constant voltage to constant current converting properties of the devices.

The value of the constant current in the output circuit may be varied to suit circumstances by tap changing on primary or secondary transformer circuits associated with the inverter I or rectifier R.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States, is:

1. Apparatus for converting direct current at constant voltage into direct current of constant value, comprising in combination, a source of constant voltage direct current, an inverter device for converting direct current of constant voltage into alternating current of constant voltage, a device consisting of an arrangement of inductive reactance and capacitative reactance by which alternating current at constant voltage supplied by the inverter is transformed into alternating current at constant value and a rectifier for converting said alternating current into direct current at constant value.

2. In combination, a constant voltage direct current circuit, an inverter having an input circuit connected to said direct current circuit for changing constant voltage direct current to constant voltage alternating current, means for transforming said constant voltage alternating current to alternating current of constant value, and rectifying means for changing said alternating current of constant value to direct current of constant value.

3. In combination, a source of constant voltage direct current, an electric valve inverter for changing the constant voltage of said direct current circuit to constant voltage alternating current, means including a monocyclic network comprising reactances of opposite sign for transforming said constant voltage alternating current to alternating current of constant value, and electric valve rectifying means for changing said alternating current of constant value to direct current of constant value.

4. In combination, a source of constant voltage direct current, an inverter having an input circuit connected to said direct current circuit for changing constant voltage direct current to constant voltage alternating current, means for controlling and maintaining the frequency of said alternating current at a value substantially above commercial frequencies of the order of 60 cycles, means including a network of reactances of opposite sign for transforming said constant voltage alternating current to alternating current of constant value, and rectifying means for changing said alternating current of constant value to direct current of constant value.

5. In combination, a source of constant voltage direct current, an inverter including electric valves for changing the constant voltage direct current to constant voltage alternating current, means for controlling and maintaining the frequency of said alternating current at a frequency of the order of 500 cycles, means including a monocyclic network for transforming said constant voltage alternating current to alternating current of constant value, and electric valve rectifying means for changing said alternating current of constant value to direct current of constant value.

6. In combination, a source of constant voltage direct current, an inverter for changing said constant voltage direct current to constant voltage alternating current, means for changing said constant voltage alternating current to alternating current of constant value comprising a plurality of circuits each including a network of reactances of opposite sign, each of said circuits respectively being arranged to permit only the circulation of currents of selected frequencies, a transformer having a plurality of separate primary windings respectively connected to a different one of said circuits, and rectifying means connected to be energized from said transformer.

7. In combination, a source of constant voltage direct current, an inverter including electric valves for changing said constant voltage direct current to constant voltage alternating current, means for changing said constant voltage alternating current to alternating current of constant value comprising a plurality of circuits each including a network of reactances of opposite sign, said circuits being tuned respectively to the fundamental frequency of the output current of said inverter and ascending odd harmonics thereof, a transformer having a plurality of separate primary windings each connected to a different one of said circuits and having the ratio of turns of the windings relative to the winding connected to receive said current of the fundamental frequency selected in accordance with the relation of the amplitude of the harmonic currents to the amplitude of the fundamental current supplied by said inverter, and electric valve rectifying means connected to said transformer for converting the alternating current of constant value to direct current of constant value.

ALLAN BERTRAM FIELD.
CECIL DANNATT.